(12) United States Patent
Arnold et al.

(10) Patent No.: US 10,002,256 B2
(45) Date of Patent: Jun. 19, 2018

(54) SYMBOL STRING MATCHING MECHANISM

(71) Applicant: GeoLang Ltd., Cardiff (GB)

(72) Inventors: James Frederick Arnold, Helena, MT (US); Debbie Annette Garside, Wales (GB); Arjun Ponnusamy, Wales (GB); Paul Michael Woods, Wales (GB)

(73) Assignee: GeoLang Ltd., Wales (GB)

( * ) Notice: Subject to any disclaimer, the term of this patent is extended or adjusted under 35 U.S.C. 154(b) by 169 days.

(21) Appl. No.: 14/956,384

(22) Filed: Dec. 1, 2015

(65) Prior Publication Data

US 2016/0162691 A1    Jun. 9, 2016

Related U.S. Application Data

(60) Provisional application No. 62/088,346, filed on Dec. 5, 2014.

(51) Int. Cl.
*G06F 21/10* (2013.01)
*G06F 21/60* (2013.01)
*H04L 9/32* (2006.01)

(52) U.S. Cl.
CPC .......... *G06F 21/60* (2013.01); *H04L 9/3239* (2013.01); *H04L 9/3247* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 5,915,250 A * | 6/1999 | Jain | ........ | G06F 17/30256 |
| 8,650,195 B2 * | 2/2014 | Pedersen | ........ | G06F 17/30011 |
| | | | | 707/737 |
| 2005/0035193 A1 * | 2/2005 | Gustin | ........ | G06Q 20/10 |
| | | | | 235/379 |
| 2010/0104158 A1 * | 4/2010 | Shechtman | ........ | G06K 9/46 |
| | | | | 382/131 |
| 2011/0154501 A1 * | 6/2011 | Banginwar | ........ | H04L 9/3236 |
| | | | | 726/26 |
| 2011/0258455 A1 * | 10/2011 | Johnson | ........ | G06Q 20/341 |
| | | | | 713/176 |
| 2014/0359298 A1 * | 12/2014 | Carlson | ........ | H04L 9/3247 |
| | | | | 713/176 |
| 2015/0033120 A1 * | 1/2015 | Cooke | ........ | G06F 17/2211 |
| | | | | 715/271 |
| 2015/0356147 A1 * | 12/2015 | Mishra | ........ | G06F 17/30958 |
| | | | | 707/693 |

* cited by examiner

*Primary Examiner* — Kenny S Lin
(74) *Attorney, Agent, or Firm* — Kang S. Lim

(57) ABSTRACT

A two-stage, very fast symbol string matching mechanism measures the similarity of content between data sources, allowing for efficient detection and evaluation of exact as well as inexact matches. The disclosed approach pairs complementary encoding technique comprising a first fast lookup that identifies regions of possible similarity, and a second, more computationally intensive analysis that evaluates metrics of similarity and delimits copy boundaries. The original content remains private (encrypted) during processing.

10 Claims, 18 Drawing Sheets

Signature and Entry: Generate and Store

Signature and Entry: Generate and Store

FIG 6

Example generation of characterizing symbol stream from text

Input text sequence selected
from Document: doc_ID
File position: offset
(corresponds to [402])

"...carried their divine rights with a high hand. Thus did the year one thousand seven hundred and seventy-five conduct their Greatness's, and myriads of small creatures--the creatures of this chronicle among..."

Apply a 2<sup>nd</sup> hash function
(corresponds to [421])

0xA847D0, 0x7C9280, 0x97340, 0x34849C ...

Select 3 bits per result
(corresponds to [422]);

0, 0, 0, 2 ...

Concatenate to form symbol stream
(corresponds to [423])

0 0 0 2 1 2 3 0 0 1 5 2 0 1 2 3 4 7 0 0 4 1 5 3 4 7 2 5 5 4 3 2

Store
(corresponds to [430])

Symbol stream, keyed to
doc_ID

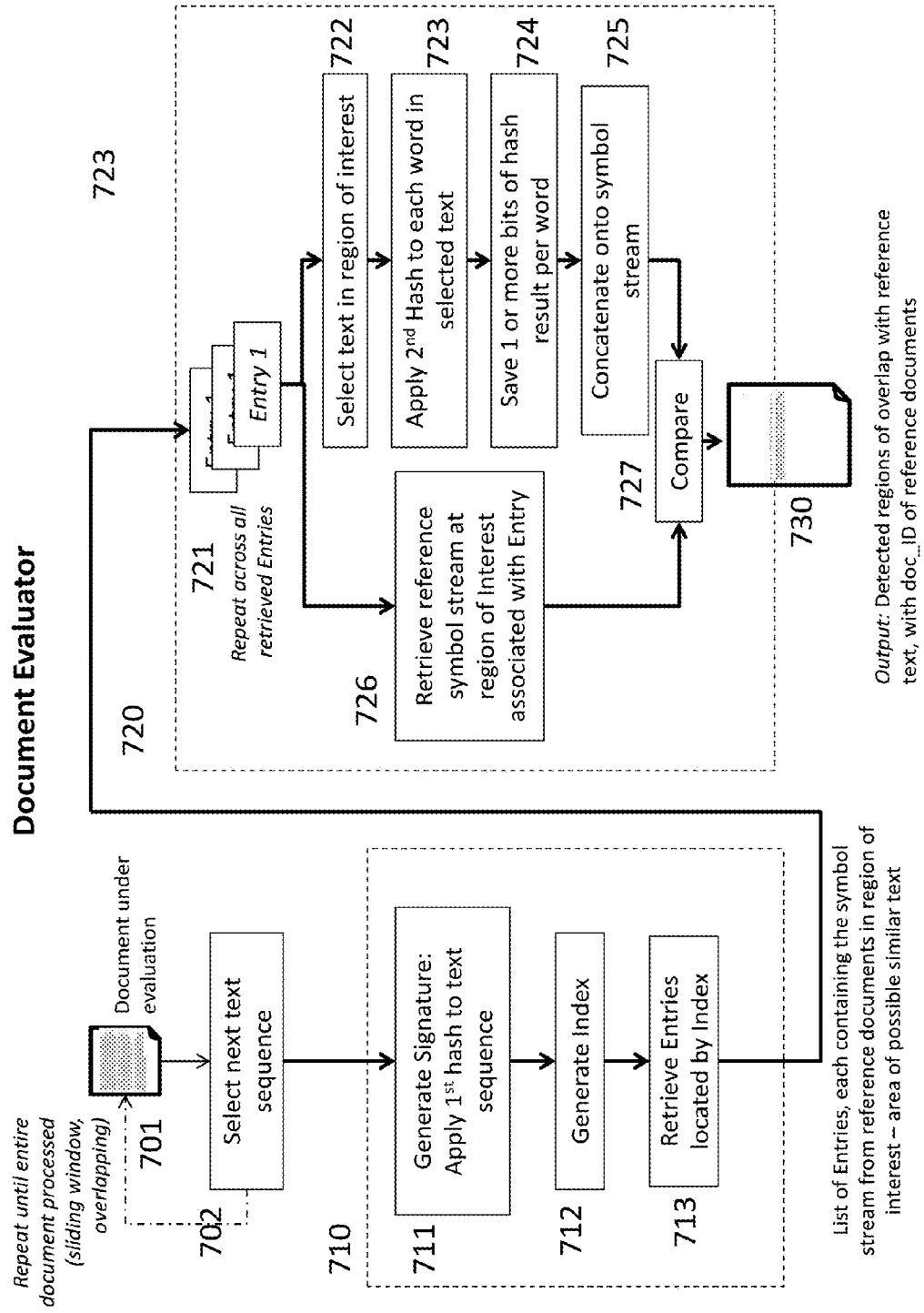

Alignment and Match Illustration

Alignment and Match Across Multiple Signatures

FIG 10
Example Input and Output of Alignment and Match Operation

[1001] Symbol streams input to algorithm:

S1 = 000212300015201234700415347255432
S2 = 002123002152012647004534725543 20

[1002] Symbol streams output from algorithm:

S1 = 000212300*152012347004153472 5543
S2 = 00*21230021520126470 04*53472 5543
         ↑              ↑          ↑        ↑
[1003]  <insert>    <delete>  <substitute>  <insert>

Edit distance = 4

Alignment & Match Illustration:
Building the Cumulative Cost Matrix with Dynamic Programming Alignment & Matching Illustration:
Selecting the Optimal Edit set
("unwind")

FIG 13
Alignment & Match Operation Example:
Resulting Optimal Edit Sequence

*(Corresponds to Fig 10)*

| Reference (S1) | Evaluation (S2) | Optimal Sequence Edit type | Cumulative Cost Index ($i_c, j_c$) |
|---|---|---|---|
| 0 | 0 |  | 1, 0 |
| 0 | 0 |  | 2, 0 |
| 0 | * | \<delete\> | 3, 1 |
| 2 | 2 |  | 4, 1 |
| 1 | 1 |  | 5, 1 |
| 2 | 2 |  | 6, 1 |
| 3 | 3 |  | 7, 1 |
| 0 | 0 |  | 8, 1 |
| 0 | 0 |  | 9, 1 |
| * | 2 | \<insert\> | 10, 0 |
| 1 | 1 |  | 11, 0 |
| 5 | 5 |  | 12, 0 |
| 2 | 2 |  | 13, 0 |
| 0 | 0 |  | 14, 0 |
| 1 | 1 |  | 15, 0 |
| 2 | 2 |  | 16, 0 |
| 3 | 6 | \<substitute\> | 17, 0 |
| 4 | 4 |  | 18, 0 |
| 7 | 7 |  | 19, 0 |
| 0 | 0 |  | 20, 0 |
| 0 | 0 |  | 21, 0 |
| 4 | 4 |  | 22, 0 |
| 1 | * | \<delete\> | 23, 1 |
| 5 | 5 |  | 24, 1 |
| 3 | 3 |  | 25, 1 |
| 4 | 4 |  | 26, 1 |
| 7 | 7 |  | 27, 1 |
| 2 | 2 |  | 28, 1 |
| 5 | 5 |  | 29, 1 |
| 5 | 5 |  | 30, 1 |
| 4 | 4 |  | 31, 1 |
| 3 | 3 |  | 32, 1 |

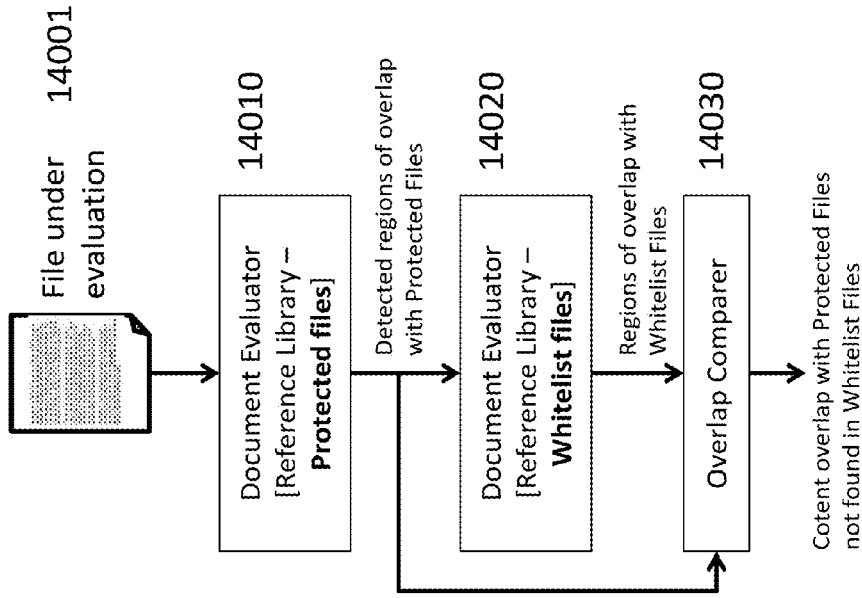

Automated Whitelisting
Example non-alert situation

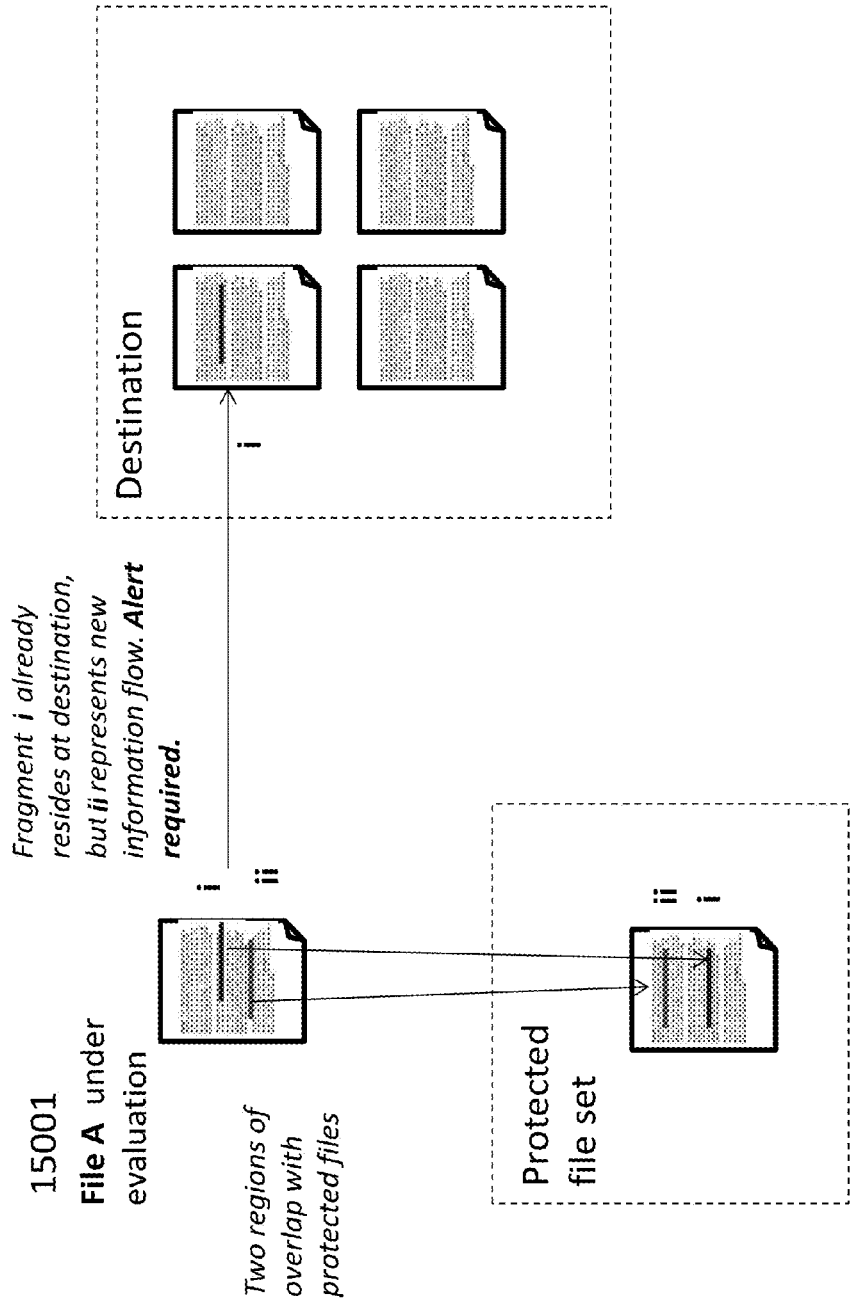

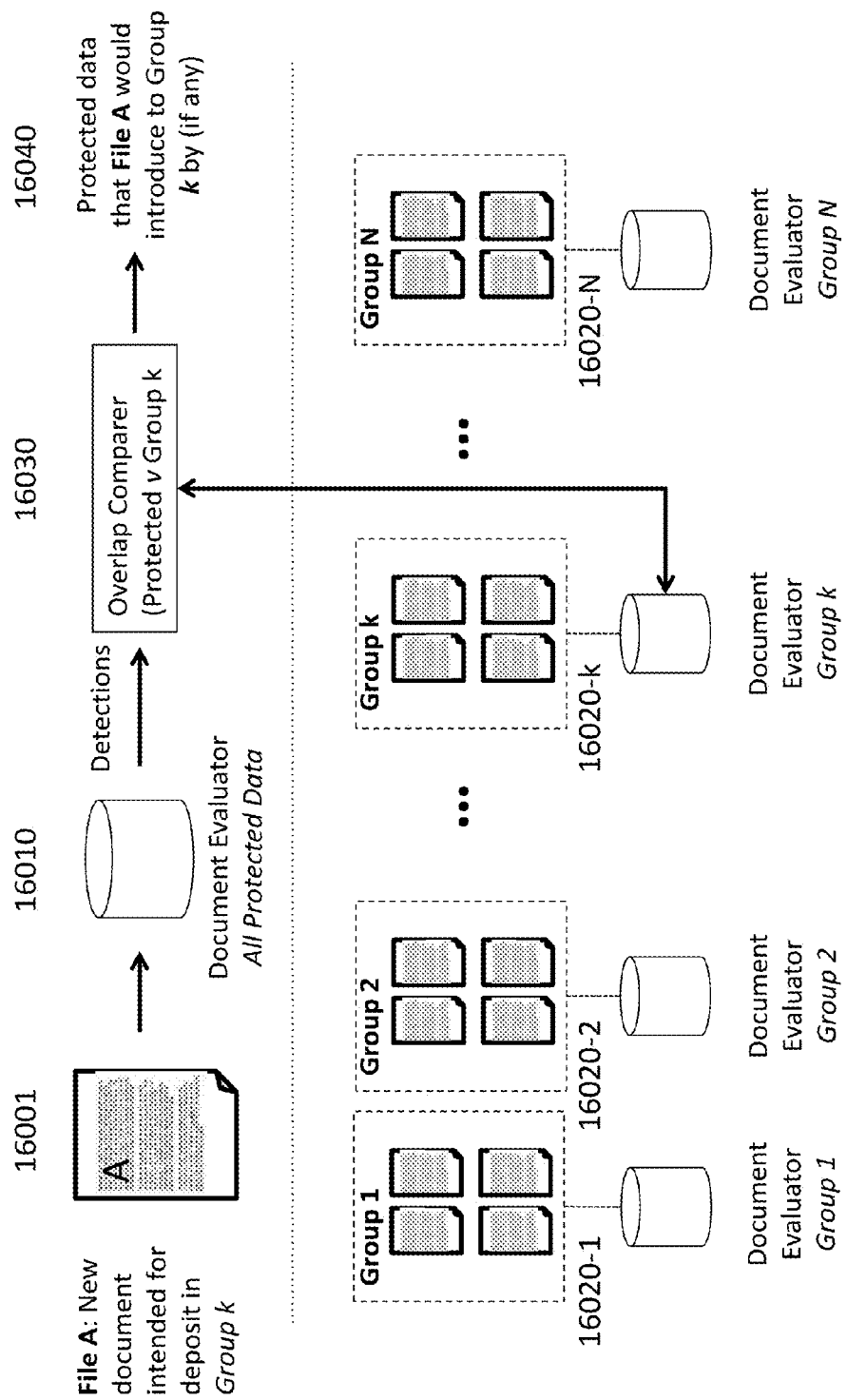

SYMBOL STRING MATCHING MECHANISM

CROSS REFERENCE TO RELATED APPLICATIONS

This non-provisional application claims the benefit of provisional application No. 62/088,346, filed Dec. 5, 2014, which application is incorporated herein in its entirety by this reference.

TECHNICAL FIELD

The present disclosure relates to information security and more specifically it relates to techniques for detecting and preventing unauthorized disclosure of sensitive information.

BACKGROUND

With the rapid increase and advances in digital documentation services and document management systems, organizations are increasingly storing important, confidential, and/or secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Further, the Internet facilitates wide and rapid dissemination of information. Along with obvious benefits, the ease of data access also creates challenge in controlling the flow of confidential information, such as private health and financial records, credit card numbers and social security numbers, intellectual property, software, designs, contracts, specifications, pre-release marketing materials, and business plans. This need has led to the development of a number of information security and control strategies that fall into the market category called "Data Loss Prevention". In addition to information security, other example applications include academic institutions deterring plagiarism, copyright holders detecting infringements, and document custodians locating content.

BRIEF DESCRIPTION OF DRAWINGS

These and other objects, features and characteristics of the present invention will become more apparent to those skilled in the art from a study of the following detailed description in conjunction with the drawings, all of which form a part of this specification. In the drawings:

FIG. 6 provides an example of a symbol stream generation process;

FIG. 7 illustrates the evaluation of documents against the reference library through an analogous set of processing steps, according to some embodiments;

FIGS. 10-13 depict an efficient method for aligning two symbol strings, representing one possible technique for implementing a Compare function;

FIG. 14 depicts a flowchart depicting one embodiment of a whitelist approach;

FIG. 15B provides another example depicting one embodiment of an automated whitelisting approach in an alert situation;

FIG. 16 presents one embodiment of an approach for monitoring and controlling information flow across workgroups.

DETAILED DESCRIPTION

Figure 1:
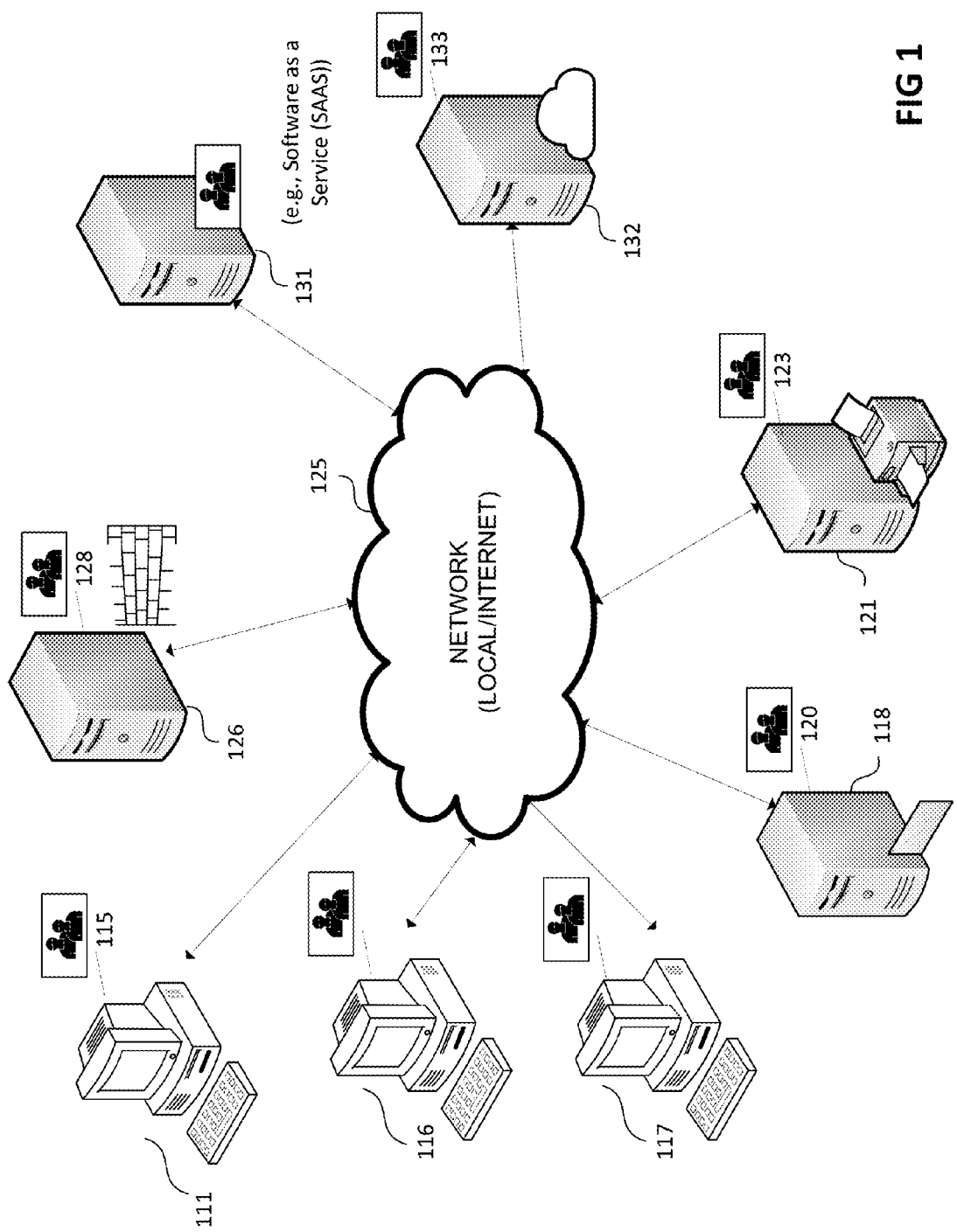
FIG. 1 illustrates an exemplary environment within which the embodiments of the symbol string matching mechanism introduced here may be implemented.

The present disclosure may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Introduced here are techniques for implementing a two-stage symbol string matching mechanism that measures the similarity of content between data sources, allowing for efficient detection and evaluation of exact as well as inexact matches.

Among others, the disclosed approach specifically addresses the task of detecting and tracking files and file fragments within data stores and devices, and as they pass across networks. Example points of deployment include corporate intranets, email systems, firewalls, and private and public cloud file-sharing services. Exemplary benefits that the techniques disclosed herein may bring include: (1) Reliably detect reference information, including short data copies, potentially embedded in larger files—to achieve high true alarm rate. (2) Reliably ignore non-matching data—to achieve low false alarm rate. (3) Prove computationally efficient, capable of carrying out real-time monitoring across large data stores and networks with minimum expense. (4) Where appropriate, ignore copies of low-risk information, such as template information, marketing write-ups, disclaimers, and other public or widely disseminated information—to minimize staff time and distraction. (5) Achieve security and privacy. Specifically, the system should not retain information that would enable an adversary to recover the original data from protected reference files.

General Environment

FIG. 1 shows one example of an overall setup to implement a document safeguard using the symbol string matching techniques introduced here. One of the means by which a user can disclose digital information outside of the organization's perimeter is by disclosing the information through his computer system 111. Examples of such a computer system include a desktop computer, a laptop, a PDA or any such device that allows a user to access the organization's information. In one embodiment, the computing system 111 is connected to a network 125. Through the computing system 111, which the user accesses the organization's secure information, the user would be able to transfer information outside of the organization by transferring the information to any medium connected to the computer.

Such points at which information can be transferred outside of the organization's protected environment are called egress points. Examples of transferring data at egress points include copying the information from the computer to a CD disk or any other optical storage medium, copying the information to a floppy drive or any other tape medium, copying the information to a USB key or other flash based storage medium, transferring the information by printing the information using a printer, copying information to "the clipboard" (i.e., a memory buffer) of the local operating system, transferring or copying information to a cloud-based storage or to another cloud-based service, etc. In such an event, all the information that is transmitted through the computer 111 needs to be monitored to ensure that secure or sensitive information does not get transferred.

To achieve this purpose of safeguarding sensitive information, the various egress points of the computer 111 are monitored to detect any activity that purports to disclose information through the egress points. For example, a software agent (which may be called the document safeguard 115 for purposes of discussion herein) may run on the computer 111 to monitor activity at the egress points (e.g., CD disk, USB, floppy disk) associated with the computer 111. If the organization supports more than one computer system, in some embodiments, each of these computer systems (111, 116, 117) can have copies of document safeguards installed on them to ensure that the activity on each of the computer systems is monitored. In one embodiment, the document safeguard 115 is a set of computer instructions or a computer implemented program available on a memory location (e.g., on a magnetic tape drive, a flash memory drive) at the site of the document safeguard 115.

In addition to being installed in every computer system (111, 116, 117) in the network, the document safeguards may also be installed on other vulnerable egress points across the organization. One example of such a vulnerable egress point includes one or more email server systems 118 connected to the network. The email server 118 handles and routes the emails sent out and received by the organization. The document safeguard 120 installed on the email server 118 monitors the emails desired to be sent out of the organization through the email server. Another example of a vulnerable egress point could be a print server 121 connected to the organization's network. A document safeguard 123 can be connected to or installed on the print server 121 to monitor print jobs sent by the users to the printers connected to the network.

Additional examples of vulnerable egress points include network appliance systems 126. Here, a document safeguard 128 can be installed in each network appliance in the network appliance systems 126 to ensure that information disclosed through a particular network appliance is monitored. Examples of using network appliances 126 to transfer data include sharing of data over a network share medium, data transferred at the socket or TCP layer of the network, etc. It is understood that in addition to these examples, the egress points also include other porous environments through which information can be disclosed by the user beyond the secure environment of the organization.

In yet another scenario, an individual of the organization may leak the sensitive information even without passing through the individual's computer. For example, a first individual of the organization may store sensitive information on a cloud space on a computer system (e.g., cloud server 132) that provides cloud-based storage and/or other cloud-based services (e.g., email services, messaging, task management or workspace collaboration). A second individual of the organization who has access to the cloud space can copy the sensitive information from the first individual's cloud space to another cloud space on the cloud server 132. In this scenario, a document safeguard 133 may be installed on the cloud server 132 to monitor and to prevent the sensitive information from being copied or transferred. Additionally or alternatively, a document safeguard server 131 may provide document safeguard as a service to, for example, the cloud server 132 so as to enable the cloud server 132 with increased data security. For example, the document safeguard server 131 can provide the document safeguard as a service via an application programming interface (API) to the cloud server 132 and/or to other computers mentioned here.

In one illustrative embodiment, the computer systems and all other systems representing egress points (the egress point systems) are centrally connected to a network 125. In one embodiment, the network includes a local network. This includes a network that is managed and maintained locally by the organization. In another embodiment, the network could also be the Internet. In the case of the Internet, each of the egress point systems could be directly and individually connected to the Internet, or could be connected to a local network or a cluster of local networks, with each of the local networks communicating with each other through the Internet. Other combinations of the egress point systems within the local network and the Internet are possible and such combinations will be apparent to a person of skill in the art.

All the aforementioned sites where a document safeguard can be installed or from where a document safeguard can be provided (e.g., the user's desktop/laptop computer, one of the network appliances, etc.) are examples of vulnerable egress points in a network system. Accordingly to the present embodiments, the document safeguard can implement a symbol string matching mechanism for detecting and preventing unauthorized disclosure of sensitive information.

General Approach

Figure 2:
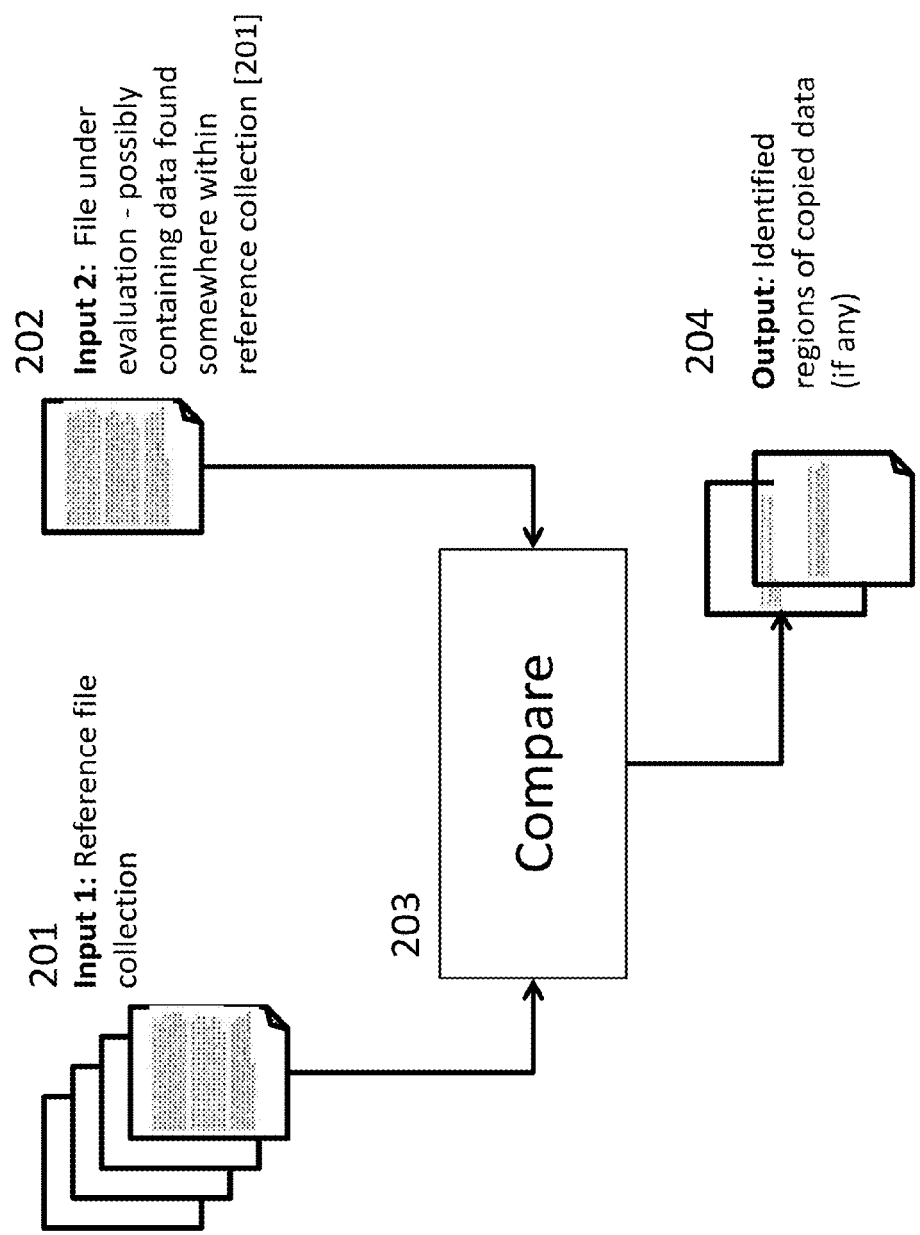
FIG. 2 depicts a problem statement block diagram further detailing the environment of FIG. 1 in which a symbol string matching mechanism can be implemented.

FIG. 2 depicts a problem that may be encountered in the environment of FIG. 1. As described in more detail below, the problem can be solved or alleviated by the techniques introduced here in a more efficient and accurate way. The problem begins with a collection of data files of interest, shown as Input 1 201. The task is to test files on Input 2 202 to determine whether they contain one or more data subsets found anywhere within the Input 1 reference collection. Importantly, a solution must detect partial copies, such as excerpts, as well as materially similar but inexact matches. The following paragraphs describe the approach with respect to this symbol string matching mechanism.

Our approach follows a two-stage data copy detection strategy:

1. Identify Regions of Interest.

Locate possible data matches between reference and with high positive detection rate (possibly at a high false alarm rate). This step may involve locating short exact matches, incomplete matches, or, in the case of text, may include topic or keyword recognition. At this phase of processing the system may search against large reference file collections, and needs to operate at high computational efficiencies.

2. Evaluate Regions of Interest.

Determine the probability of copy by estimating data similarity. This stage exhibits a low false alarm rate while retaining true detections. As it applies only to a limited set of candidates, it may employ computationally intensive techniques.

The files may contain any form of data, for example text, audio, imagery, video, or arbitrary forms of binary. The disclosed technique offers particular advantages, however, when working on data characterized as symbol strings where the combination symbol value, proximity and order conveys information. Examples include human language text, numeric tabulations, database entries, and software (including source code, p-code, compiled binaries, and other forms of sequential logic). Although applicable to many data types, the descriptions below center on text to invoke intuitions helpful in understanding the technique.

General Architecture

Figure 3:
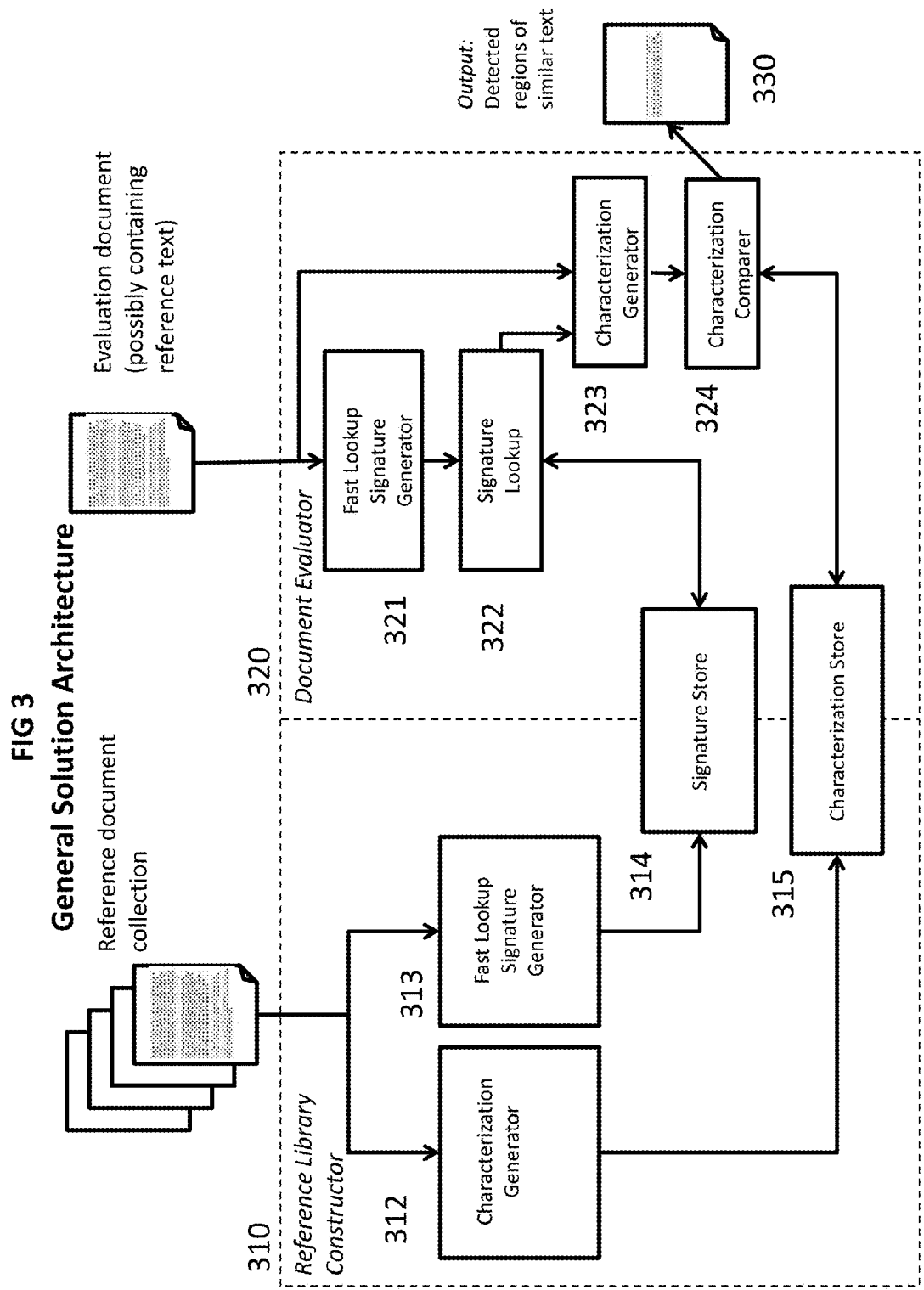
FIG. 3 depicts a general solution architecture for a symbol string matching mechanism.

FIG. 3 is a general solution architecture for a symbol string matching mechanism. The General Solution Architecture (FIG. 3) comprises two main functions. The Reference Library Constructor 310, shown on the left of FIG. 3, processes documents to generate and store Signatures and Characterizations (Signature Store 314, Characterization Store 315). Following the strategy described above:

(1) Signatures enable Stage 1 by providing a first indication of similarity between files. Signatures facilitate rapid lookup into large collections of files. In some embodiments, the system can employ a cryptographic algorithm such as a secure hash algorithm (SHA) for converting large streams of data into a hash value in generating a signature. One example of the SHA that can be employed by the present techniques is SHA-256. In the examples that employ SHA-256, the resulting hash value from the SHA-256 will be 256 bits long (which is typically more than the system needs). For example, with a 12-word length text, the system implementing SHA-256 can generate a 256-bit hash value using a known SHA-256 hash function. Then, the system can, in some embodiments, select 32 bits out of the 256 bits as the signature of the text. Note that, although here the signature may not be unique to the set of words (e.g., there is a possibility that another sequence of words can also generate the same hash value or even the same signature), in many embodiments the signature is sufficient for the system to identify candidate regions of interest.

Also, note that the process of selecting X number of bits from a hash value of length Y may be adjusted based on different the field applications (e.g., based on particular traits of an application, computer's workload, processing power, memory size, and/or storage size). It is observed that the length of the resulting signature may affect the storage size of the signature store that is used to store the signature. The length of the resulting signature may also affect the false alarm rate. For example, adopting 64-bit signatures may have a lower false alarm rate than adopting 32-bit signatures, but may also increase the storage space necessary for the signature store.

Further, the signature selection mechanism can be chosen differently based on different applications. In one example, a 32-bit signature is the least significant 32 bits from the 256-bit hash value. In another example, the signature is the most significant 32 bits from the hash value. An additional selection mechanism example includes using a predetermined mask to generate a signature from the hash value. However, note that the signature selection mechanism should suitably remain the same for a particular application, at least for a suitable period of time, so that the same data generates the same signature.

(2) Characterizations enable Stage 2 by providing an intermediate representation that preserves the information necessary to evaluate data similarity, alignment and bound (end points) of copied regions. This "soft" matching approach benefits detection of modified but substantially similar data, e.g., excerpted and edited text. Note that, if the system only employs Characterizations instead of both Signatures and Characterizations, the false alarm rate may be too high, thus rendering the match results less reliable.

Also note that Signatures and Characterizations retain data privacy through use of one-way hash functions. It allows detection of data copies without exposing the original (clear text) data.

The Document Evaluator 320, shown on the right of FIG. 3, accepts documents and compares them against the reference collection. The evaluation process begins with Fast Lookup Signature Generator 321 and Signature Lookup 322 to retrieve candidate matches from the Reference Library Signature Store 314; if any signature matches are found, a more complete characterization of the evaluation document is generated in the document region surrounding the signature match 323 (Characterization Generator), and compared 324 (Characterization Comparer) against the stored characterizations for the reference documents 315 (Characterization Store). Detected copied data are output 330 (Output: Detected Region of Similar Text).

Specific Implementations

Figure 4:
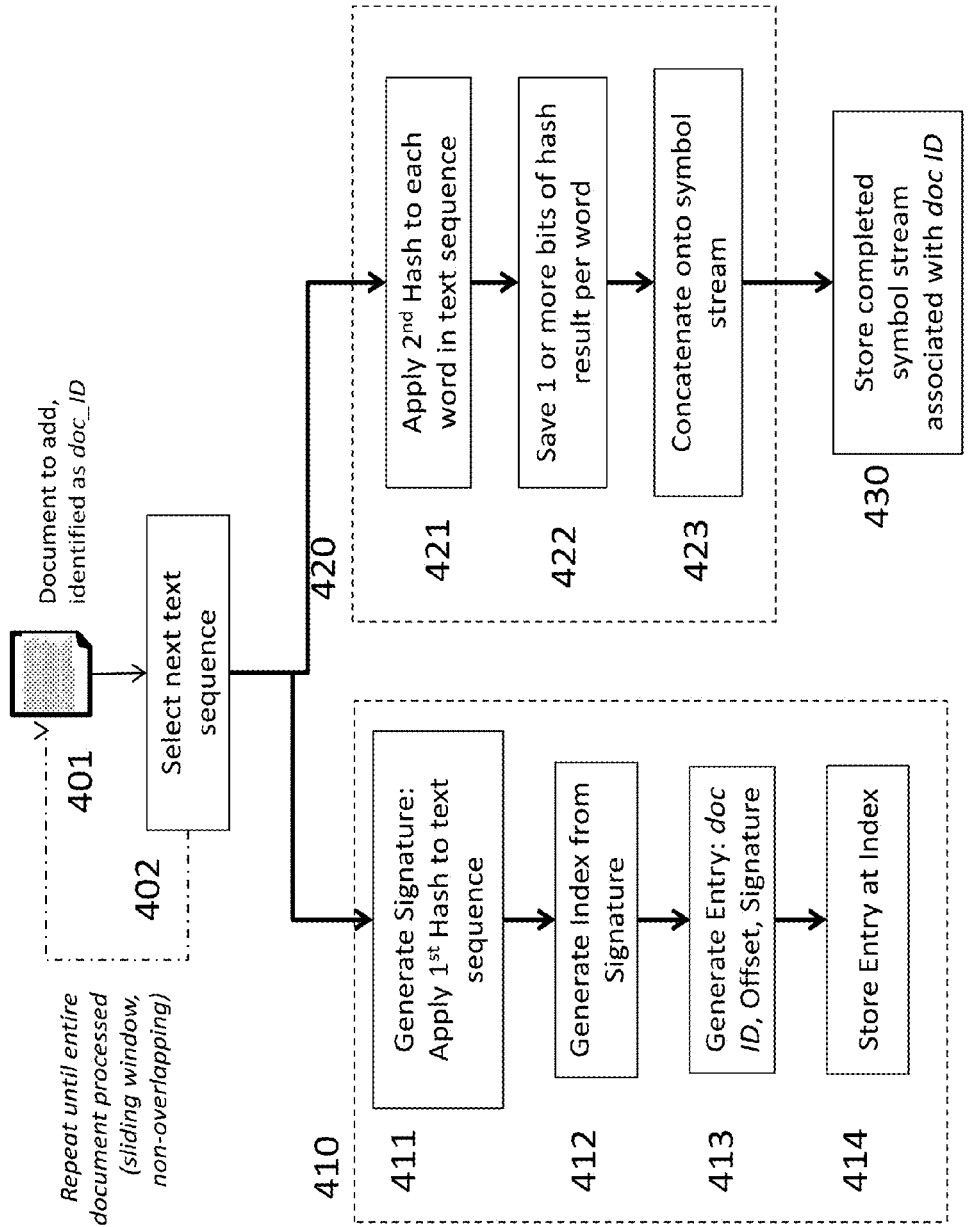
FIG. 4 depicts an implementation of a Reference Library Constructor.

FIG. 4 provides a particular implementation for the Reference Library Constructor 310 shown in FIG. 3.

The implementation accepts as input a document 401 labeled with a unique identifier doc_ID. The system runs sequentially through the document, creating a non-overlapping moving window of text 402. Process 410, shown on the left, applies a 1st hash function 411 to a fixed-length sequence of text—words, characters, or any other convenient grouping—to generate an integer-valued Signature. An Index value is generated from the signature, either directly or derivation through a bit mask or other operation 412. Step 413 generates an Entry containing the doc_ID, Offset and Signature, and 414 adds it to the Signature Store (corresponding to block 314 in FIG. 3).

Note that the Entry need not explicitly include the Signature if the storage Index and Signature are identical (in which case the signature is implied by its storage location).

A second process block 420 separately processes the selected text sequence 402. The second process block 420 generates an "intermediate representation" of the selected text sequence, and for purposes of discussion herein, the result of the process block 420 may be referred to as "characterizations." As illustrated, a 2nd hash function converts each word (symbol, or other convenient partitioning) into an integer 421; one or more bits selected from the result 422 to generate a symbol, and concatenated into a continuous symbol stream 423 associated with the entirety of document doc ID 430; this store corresponds to block 315 in FIG. 3.

Expressed as pseudo-code, adding a document to the Reference Library follows these steps:
[401] do until the complete document processed:
  [402] Select a next sequence of non-overlapping words at Offset
    on a first process [410]
      [411] Generate Signature by applying a $1^{st}$ hash function to the selected sequence of words
      [412] Generate Index from the Signature
      [413] Generate an Entry comprising doc_ID, Offset and Signature
      [414] Store Entry at an Index derived from the Signature
    on a second process [420]
      [421] Apply a $2^{nd}$ hash function to each word of text in sequence
      [422] Save one or more bits for each word
      [423] Concatenate into a symbol stream;
  [430] When the entire document has been processed, store the resulting derived symbol stream, keyed to document doc ID Additional documents can be included in the reference library by re-iterating these processing steps. Further, in an embodiment, steps 412 and 421 can be built from any convenient hash function including, for example, any from the well-known SHA series.

Figure 5:
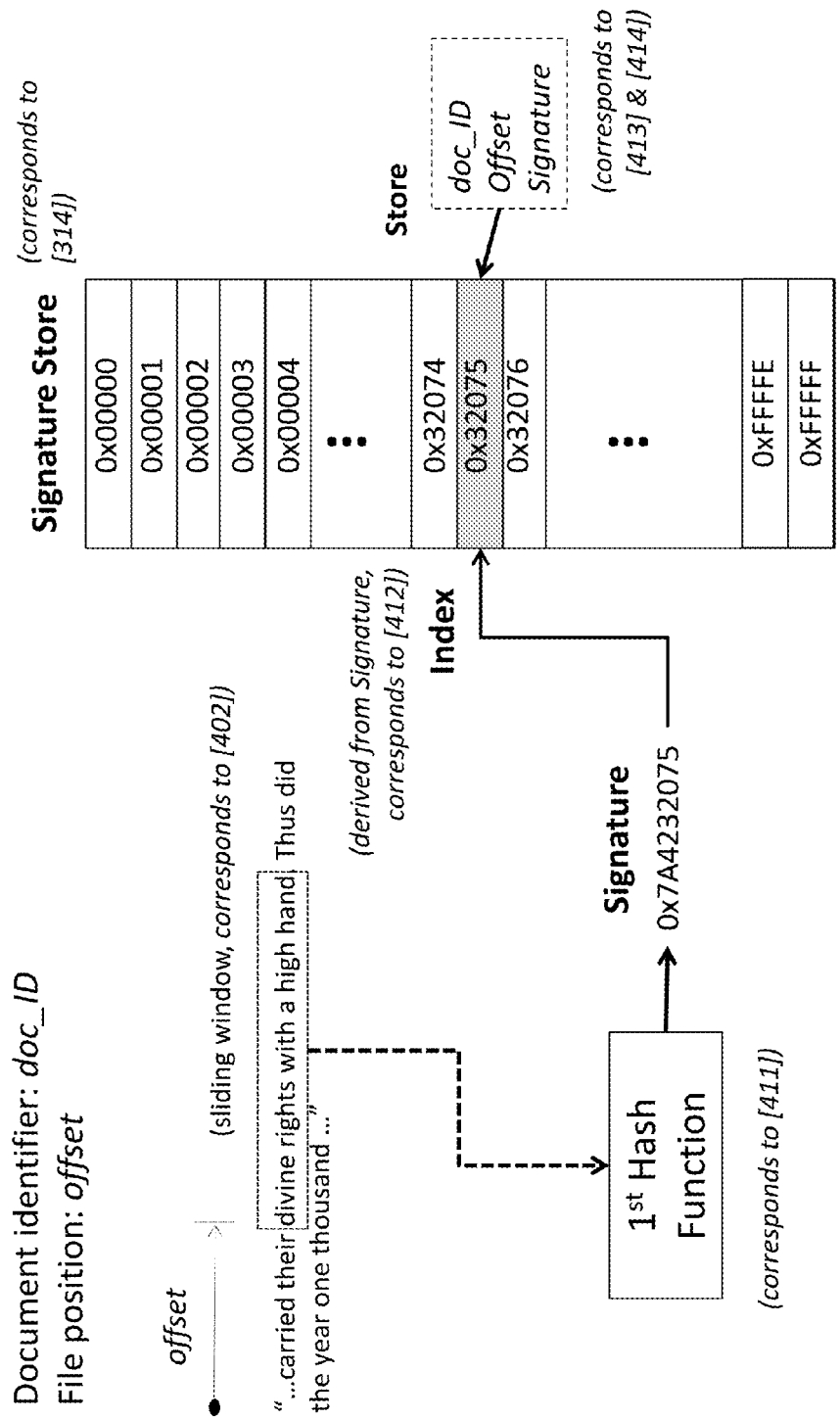
FIG. 5 illustrates an example of a Signature and Entry generation and store process.

FIG. 5 illustrates the Signature and Entry generation and store process of 410.

FIG. 6 provides an example of symbol stream generation process of 420.

Conversely, a document can be removed from the reference library by reprocessing the document and removing entries associated with its signatures. Alternatively, the system may facilitate deletions by maintaining an auxiliary database that links document IDs to entries.

FIG. 7 illustrates the evaluation of documents against the reference library through an analogous set of processing steps. The evaluation begins by searching for reference library entries using signatures generated from the evaluation document; and then, as necessary, generating and comparing the characterizing symbol stream against the symbol streams corresponding to the retrieved reference library documents.

Figure 8:
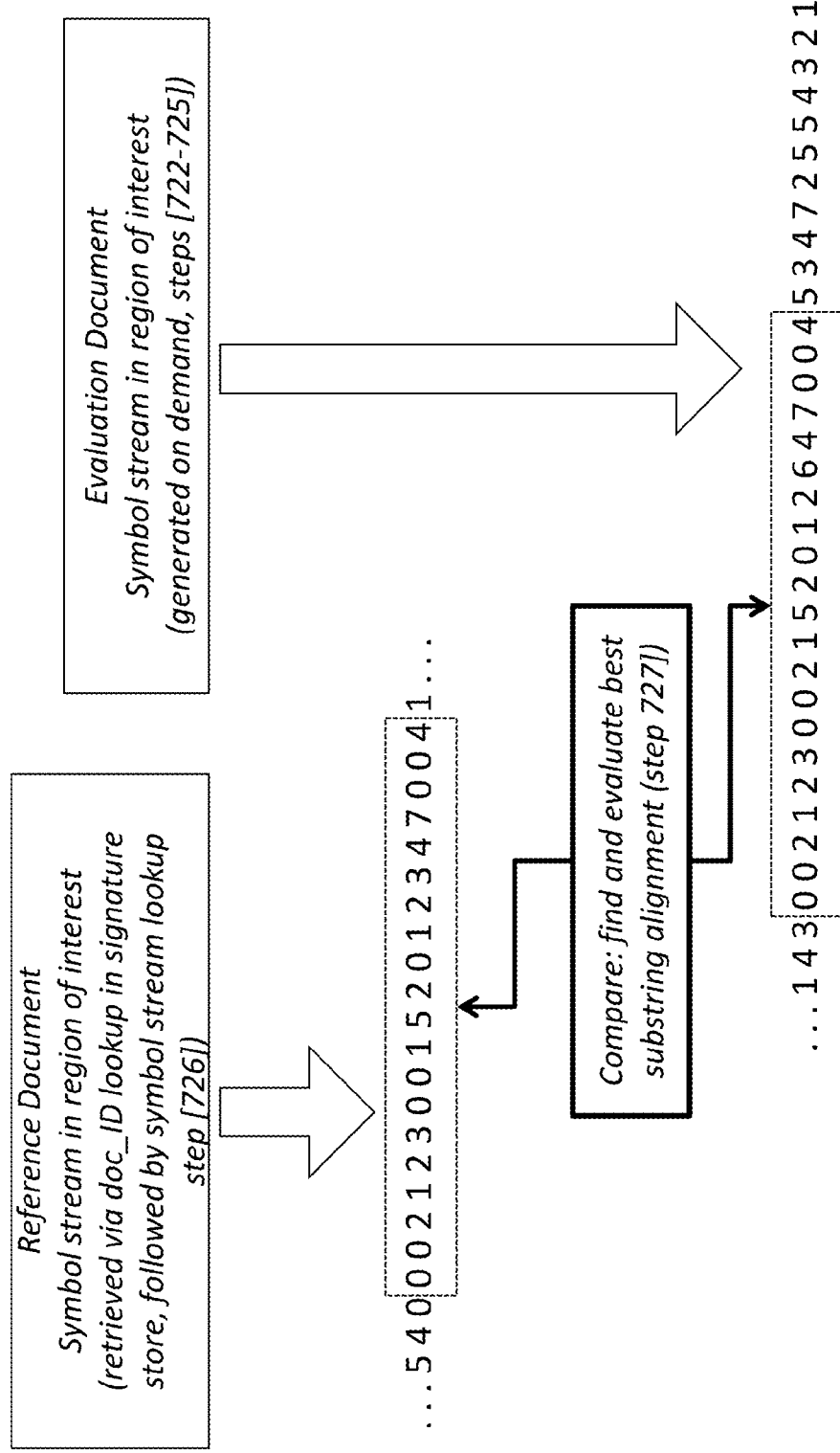
FIG. 8 illustrates an example of the symbol string alignment and evaluation process carried out over a region of interest identified from a single entry.
Figure 9:
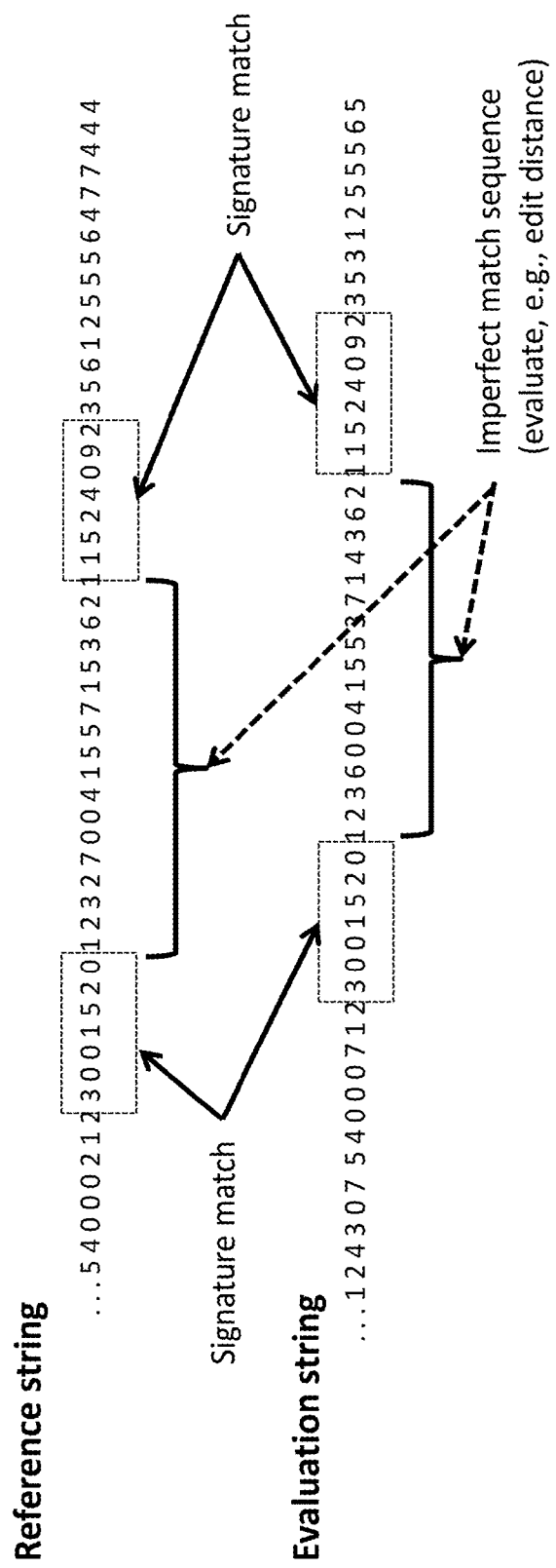
FIG. 9 provides an example where two entries from a single reference document match the evaluation document in relative proximity, but separated by an imperfect text sequence.

Expressed as pseudo-code, to test an evaluation document against a Reference Library:
do until the complete document processed [701]
  Select a next sequence of words [702] (overlapping—shift 1 word per iteration)
    as a first step: [710], retrieve candidate Entries:
      [711] Generate Signature by applying a $1^{st}$ hash function to the selected sequence of words
      [712] Generate Index from the Signature
      [713] Retrieve any Entries found at Index
    as a second step: [720], carry out detailed comparisons for each retrieved Entry: [721]
      [722] Select text within the evaluation document surrounding the current text sequence
      [723] Apply the 2nd hash function to selected text
      [724] Save 1 or more bits for each word
      [725] Concatenate to form the evaluation document symbol stream in the region of interest
      [726] Retrieve corresponding symbol stream of reference library document near entry location
      [727] Compare the symbol streams of reference and evaluation documents to estimate the length and similarity of copied text
  [730] Aggregate and output matches FIG. 8 illustrates an example of the symbol string alignment and evaluation process 727 carried out over a region of interest identified from a single entry. Although not shown in FIG. 8, this step can also be carried out in two parts: a search left, to identify text at and preceding candidate overlap; followed by a search right, to identify text at and following candidate overlap. FIG. 9 provides an example where two entries from a single reference document match the evaluation document in relative proximity, but separated by an imperfect text sequence; in this case, the alignment and match process evaluates the similarity of the intervening sequence to generate composite match.

Alternative embodiments may incorporate other methods to preselect text of interest, including keywords or topic identification. Alternatively, structured documents may often contain confidential information in specified fields, and thus identified by recognizing and aligning with the corresponding document fields.

Example Alignment & Matching Embodiments

FIGS. 10-13 depict an efficient method for aligning two symbol strings, and represent one possible technique for implementing the Compare function 727 in FIG. 7. The technique identifies the minimum set of edits—deletes, substitutes, and inserts—that match a first symbol string to a second symbol string. The resulting match is then scored according to its edit distance, and compared to a threshold. The threshold indicates how many edit distances the system is set to tolerate before a potential match alert is raised, and therefore the threshold affects the alarm rate. As such, note that the false alarm rate may be higher if the threshold for edit distance is set to be 5 rather than 10 (e.g., for every 50 symbols).

FIG. 10 provides an example with two similar but not identical symbol strings S1 and S2, where each symbol takes on values 0 . . . 7 (i.e., 3-bit unsigned integers). In this example the input 1001 consists of 32-element S1 and S2 strings. Taking S1 as the reference, S2 differs from S1 by three alignment errors and one symbol mismatch, comprising an edit set containing two inserts, one delete, and one substitution. This results in an edit distance of 4—that is, if all edits were weighed equally, an optimization procedure will select these four edits to best match S2 to reference S1.

In principle, a solution might directly carry out an exhaustive search:
1. Enumerate all possible edit sets of S2;
2. Compare and score each candidate against S1;
3. Select the edit set that results in the lowest total cost.

The computational complexity of this approach, however, grows exponentially with string length.

Dynamic programming provides an efficient alternative means for implementing the optimization process provided that string errors occur randomly and independently. Noted that, the use of dynamic programming can also avoid local optimization problems (i.e., reaching a solution that is only locally optimized but not globally optimized). In the described procedure, computational complexity grows linearly with string length.

The optimization process consists of two stages: (1) build a cumulative cost matrix that spans possible edits; and (2) identify the lowest-cost path through the matrix.

Figure 11:
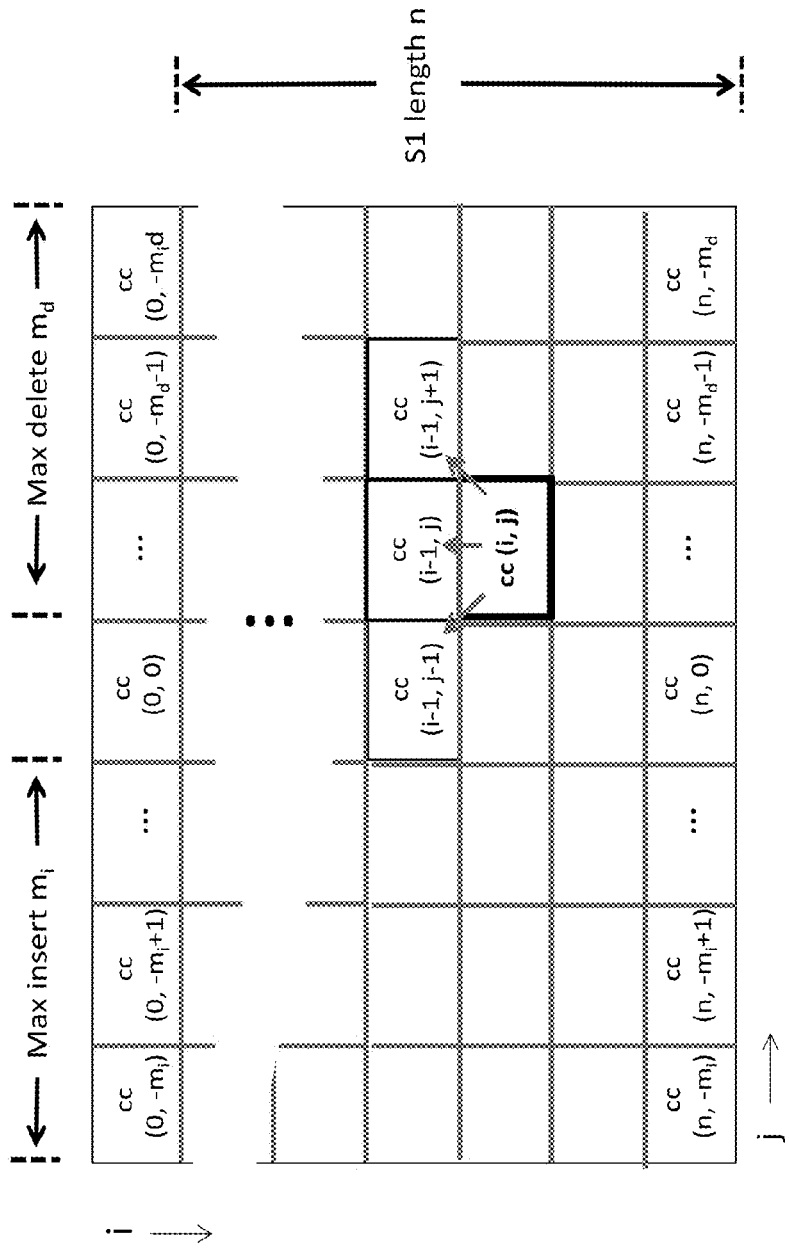
Figure 12:
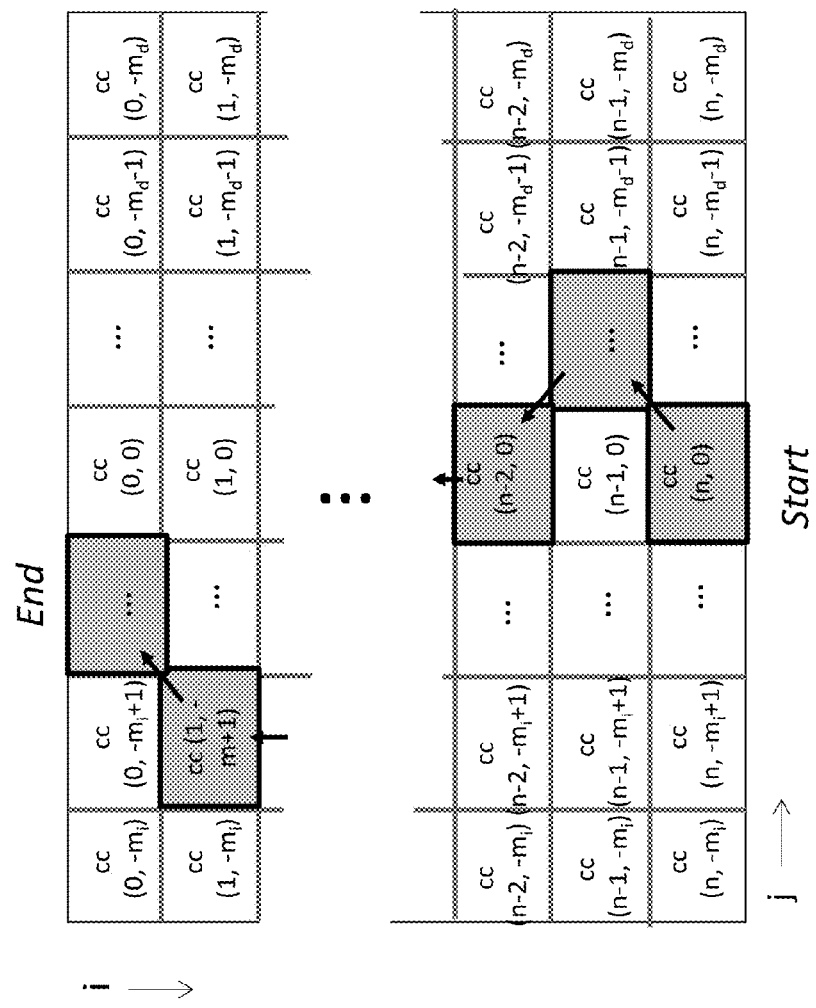

As illustrated in FIG. 11, the first step of the optimization process generates a 2-dimensional cumulative cost matrix with row dimension n, where n is the length of reference string S1, and column dimension $m_i+m_d+1$, where mi and md indicate the maximum number of allowed inserts and deletes, respectively. The center column represents S2 perfectly aligned with S1; left of center represents insertions in S2 at string position denoted by row; and right of center, deletions in S2 at string position denoted by row.

The algorithm begins by filling the top row with the cost value associated with the indicated number of deletions or insertions, e.g., the center column value=0, the immediately left cell=$C_i$, the cost of a single insertion, its left-adjacent cell=2 $C_i$ (cost of two insertions), etc., until reaching the left edge with cell value=$m_i$ $C_i$; and similarly, moving right of center for deletes, values $C_d$, $2C_d$, . . . $m_d$ $C_d$.

The procedure continues to the second row, and then in each subsequent row, for every cell cc(i, j), selecting the upper adjacent cell that minimizes a cumulative cost calculated by:

$$cc(i,j)=\min[cc(i-1,j+1)+C_d, \text{//shift right: delete symbol in } S2 \text{ with cost } C_d$$

$$cc(i-1,j-1)+C_i, \text{//shift left: insert symbol in } S2 \text{ with cost } C_i$$

$$cc(i-1,j)+C_s] \text{ //step forward with cost}$$

$$// C_s = C_{mm} \text{ if } S1[i]=S2[i+j], \text{ else } C_s=0$$

Where:
$C_i$=cost of an insertion
$C_d$=cost of a deletion
$C_s$=cost of a step, either $C_{mm}$ for symbol substitution (S1 and S2 not matching at current alignment, as denoted by S1 at position i vs. S2 at i+j); or $C_s$=0 if S1 and S2 match.

The algorithm terminates either at the bottom (nth) row, or when the cumulative cost value exceeds some allowed maximum.

The process to retrieve ("unwind") the optimal set of edits, then, operates as follows (FIG. 12):

Select the cell in the last row that contains the lowest cumulative cost value, where j may take any value in range $-m_i$ to $+m_j$. Store the indices ($i_o$, $j_o$) and the corresponding cost value cc($i_o$, $j_o$).

Thereafter, work upward through the cost matrix:

For the cost cell cc($i_o$, $j_o$) selected in previous iteration, choose one of the three upper adjacent cells with the lowest cost value (i.e., select one of: cc($i_o$−1, $j_o$−1), cc($i_o$−1, $j_o$) or cc($i_o$−1, $j_o$+1))

Save the resulting index values and edit type: if the selected cell implies a move left in the matrix, mark the edit as 'insert', if a move right, mark as 'delete'; if directly above, and S[i] is not equal to S[i+$j_o$]), mark as 'substitute';

Repeat until reaching the top row.

The resulting list indicates the optimizing sequence of edits given the strings S1, S2, the cost constraints $C_i$, $C_{id}$ and $C_{mm}$, and the maximum number of deletes or inserts md and mi, respectively. The processing complexity is on order n×($m_i+m_j+1$). FIG. 13 provides the output corresponding to example of FIG. 10.

Some applications require only the similarity measure—edit distance, for example—and not the detailed list of edit types (inserts, deletes, substitutions) and locations (string offset locations of said edits). In such cases the full cost matrix need not be stored. Reviewing the optimization equation provided above, note that only the current and previous rows are required. As a result, the algorithm can rely on a 2-row circular buffer that stores only the current and previous rows (i and i−1) of the cost matrix. This drops the cost matrix size from n(2d+1) to order 2(2d+1), thus realizing a storage reduction factor of n/2.

In practice this can substantially reduce memory requirements; matching two 10,000-word texts, for example, which represents about 20 pages of typical text, the approach reduces memory requirements by a factor of 5,000.

The optimal sequence may yield a match cost above threshold, or may suffer significant errors on the leading or following edges of the match region. In these cases the optimizing sequences may require end pruning or segmentation:

(1) Prune: delete sequence components from ends where the substrings generate high edit costs (for example, in cases of poor initial string alignment);

(2) Segment: repartition the sequence into two or more shorter sequences, and remove intervening subsequences that create high match costs.

False Alarm Analysis

"False alarms" are alerts generated through unfortunate mathematical coincidence rather than a true data copy. In a text application, for example, false alarms occur when differing text strings generate both a) an identical Signature and b) a sufficiently similar Characterization to trigger detection. In applications where false alarms are relatively rare, the false alarm probability for our two-step approach approximates to the product of the false alarm rates for each stage:

$$P_{fa} \sim = P_{FA\text{-}Signature} \cdot P_{FA\text{-}Characterization}$$

The Signature false alarm rate is set by its underlying hash function collision rate, an can be approximated by $$P_{FA\text{-}Signature}(s) \sim = k_p/S \text{ (false alarms per tested signature)}$$

where $k_p$ represents the total number of signatures of the protected documents, and S the size of the signature space (typically some large integer $2^n$, where n=size of each signature in bits).

The false alarm for the characterization matching process depends on the match evaluation parameters. False alarm rates $P_{FA\text{-}Characterization}$ typically range $10^{-7}$ to $10^{-3}$, where $10^{-7}$ corresponds to relatively stringent match constraints (small edit distance, larger excerpts of similar text), and $10^{-3}$ to relatively loose match constraints.

To offer insights on expected false alarm rates we offer an example. An implementation may employ a 64-bit Signature, yielding S of $2^{64} \sim = 10^{19}$. A protected document collection containing 4 TB of Microsoft Word files (or similar types) represents about 200 m pages (~100 b words) of text, and generates on order of $10^{10}$ Signatures. This produces a $P_{FA\text{-}Signature}$ on order of $10^{-9}$—one false alarm per one billion words evaluated. Assuming a typical $P_{FA\text{-}Characterization}$ of $10^{-4}$ we can expect a composite false alarm rate of about $$P_{fa} = P_{FA\text{-}Signature} \cdot P_{FA\text{-}Characterization} = 10^{-9} \cdot 10^{-4} = 10^{-13}$$
per evaluated word.

A 20-page evaluated document corresponds to about $10^4$ words, yielding a per-document false lookup probability of $$P_{PFA\text{-}Characterization}(s) \sim = 10^4 \cdot 10^{-13} = 10^{-9}$$

The experiments bear out a very low false alarm rate consistent with this result—in practice, they rarely occur. Valid but unwanted detections, however, may prove a greater challenge than false alarms, and arise from very different causes.

Unwanted Detections

Some applications suffer from a high rate of "unwanted detections" due to true copies of inconsequential data. For example, an organization's confidential and public documents may share information, such as mission statements, addresses and contact information, marketing tag lines, product disclaimers, templates and other benign items. In practice, unwanted detections occur at a much higher rate than false alarms, and can create a content management burden for information security staff.

There are at least two ways to avoid unwanted detections. The first method employs stringent matching requirements; for example, require copies to extend across most of the evaluation document. Some data loss prevention products in the market today, for example, will alert when an evaluation document overlaps a protected document by over 80%, i.e., they are substantially the same document. This requirement has the unfortunate side effect of eliminating desirable alerts, however, such as in cases of excerpts embedded in relatively large files.

The second approach avoids these limitations through a special form of "white list" that identifies and allows sharing of specific information that may also reside within protected data sets. Importantly, the approach operates whitelists at the subdocument level—in text, this equates to phrases.

FIG. 14 summarizes the approach. A document 14001 is evaluated against a library index of protected files 14010, e.g., using a process as presented in FIG. 7. Block 14010 outputs the set of regions where the file under evaluation overlaps the protected data. These regions—for example, document fragments in a text application—are submitted to a second evaluator 14020. The reference library for 2nd evaluator is also constructed as in FIG. 7, but using whitelist data. The outputs of the first 14010 and second 14020 evaluators are then compared to identify and eliminate any protected detections that also reside in the whitelist 14030.

Note that the processing blocks 14010 and 14020 can be functionally similar or even identical, but with Signature and Characterization libraries constructed with protected and whitelist files, respectively.

The general approach to whitelisting can take various embodiments, where the specifics depend on the application. There are two examples:

(1) Manual. If the set of whitelist material is well established and available, the whitelist library can be created by manually feeding a reference constructor (as in FIG. 4) with whitelist data. In a document application, whitelist files may contain standard forms and templates, corporate marketing, common legal disclaimers, and other non-sensitive information. The manual approach has the drawback of requiring security staff vigilance to maintain accurate whitelists.

(2) Automated. A second approach eliminates the need for manual whitelisting by monitoring file content location and flow (at the file fragment level). The solution strategy centers on information risk management: identifying (and possibly stopping) the flow of protected data that has not been previously shared, while allowing sharing of previously released data. With this approach the system will automatically ignore common data fragments such as described above (templates, corporate marketing, etc.).

Figure 15A:
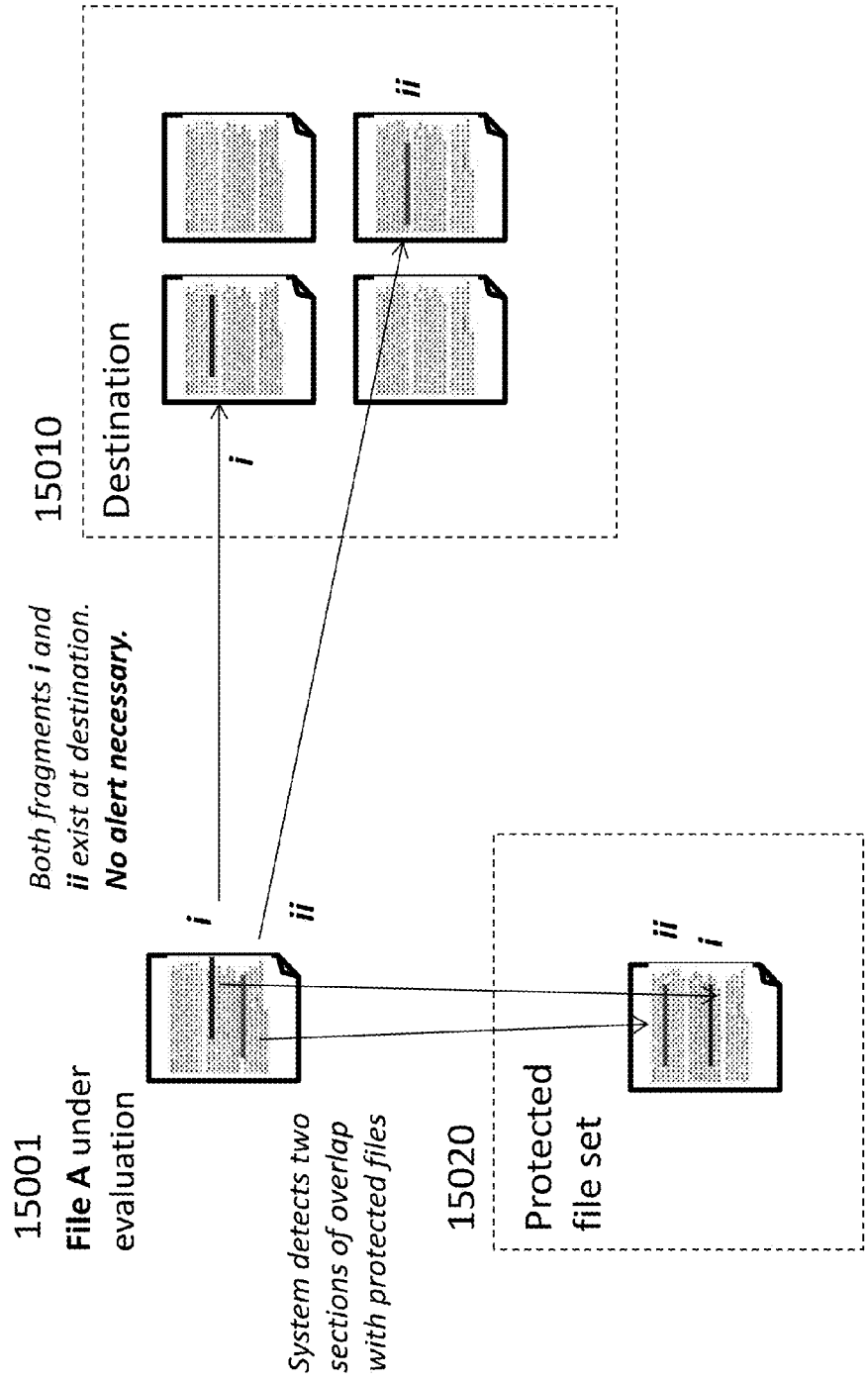
FIG. 15A provides an example depicting one embodiment of an automated whitelisting approach in a non-alert situation.

FIGS. 15A and 15B respectively provide a graphical example. A File A 15001 is considered for release into a Destination 15010, where the destination represents the group of users who can access the file after transfer, e.g., a personal or workgroup folder in a content management system (CMS), including cloud-based filesharing, or Enterprise CMS systems such as SharePoint; with another company; or at-large public. File A is evaluated against a protected file set 15020 to identify possible content overlap, resulting (in this example) in two identified fragments, labeled as i and ii. The detected overlaps are then compared against the existing content at Destination 15010. In the example of FIG. 15A both fragments i and ii are also found at the Destination, indicating that the release of File A to Destination does not introduce new protected information. As a result, it does not require an alert.

The example of FIG. 15B, in contrast, finds that Destination 15010 contains only one of the two protected fragments, thus necessitating an alert.

FIG. 16 presents one embodiment of this approach for monitoring and controlling information flow across workgroups. Each workgroup has a collection of files and an associated Document Evaluator 16020 that registers all workgroup file fragments.

A central evaluator 16010 registers all protected files.

In the example shown, a File A 16001 is under evaluation for delivery into a repository for workgroup k. Document Evaluator 16010 analyzes File A to detect any protected data fragments. The Overlap Comparer 16030 compares the results of 16010 to the Document Evaluator associated with workgroup k (labeled as 16020-$k$), and outputs the set of protected content fragments not already contained in (and thus not previously released to) workgroup k.

Figure 17:
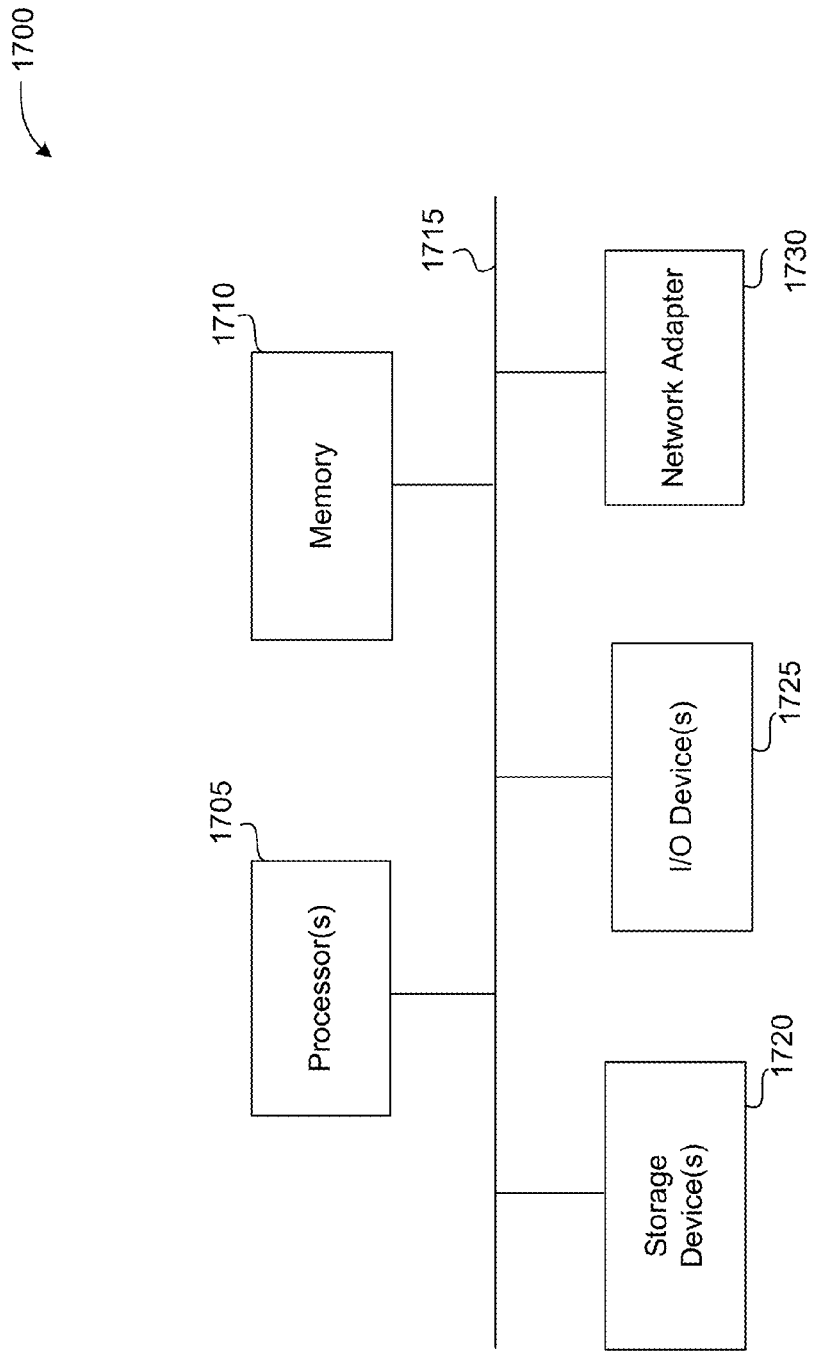
FIG. 17 is a block diagram of a computer system as may be used to implement various embodiments of the described herein.

FIG. 17 is a block diagram of a computer system as may be used to implement features of some embodiments of the disclosed technology. The computing system 1700 may be used to implement any of the entities, components or services depicted in the examples of FIGS. 1-16 (and any other components described in this specification). The computing system 1700 may include one or more central processing units ("processors") 1705, memory 1710, input/output devices 1725 (e.g., keyboard and pointing devices, display devices), storage devices 1720 (e.g., disk drives), and network adapters 1730 (e.g., network interfaces) that are connected to an interconnect 1715. The interconnect 1715 is illustrated as an abstraction that represents any one or more separate physical buses, point to point connections, or both connected by appropriate bridges, adapters, or controllers. The interconnect 1715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1710 and storage devices 1720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1710 can be implemented as software and/or firmware to program the processor(s) 1705 to carry out actions described above. In some embodiments, such software or firmware may be initially provided to the computing system 1700 by downloading it from a remote system through the computing system 1700 (e.g., via network adapter 1730).

CONCLUSION

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The systems corresponding to the methods explained above and associated embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the described examples in the above disclosure are not to be considered as limiting.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for comparing content between data sources comprising:
    monitoring data on or in transit through a computer or network;
    identifying regions of interest in the data by comparing the data to a reference collection for at least one of short exact matches, incomplete matches, or keyword recognition by generating signatures for the data employing a cryptographic algorithm to convert the data into a hash value, and selecting a subset of bits from the hash value, wherein the subset length is field application dependent:
    determining a probability of a soft match by estimating similarity between region of interest and the reference collection.

2. The method of claim 1 wherein the soft match includes dynamic programming to align and test similarity between the region of interest and the reference collection.

3. The method of claim 1 wherein the data comprises data from a database, a document file or folder, or other source or format of digital data.

4. The method of claim 1, wherein the cryptographic algorithm is secure hash algorithm-256.

5. The method of claim 1, wherein the field application dependency includes at least one of particular traits of an application, computer's workload, processing power, memory size, and storage size.

6. The method of claim 1, wherein the identifying regions of interest further comprises comparing the signatures to a reference library signature store.

7. The method of claim 6, wherein determining the probability of the soft match comprises comparing characterizations of the data to characterizations contained within the reference library.

8. The method of claim 7, wherein characterizations provide intermediate representations of the data that preserves approximate alignment and end points of candidate matches, and performs soft matching between the intermediate representations and the characterizations contained within the reference library.

9. The method of claim 6, wherein the reference library signature store is generated by applying a first hash function to a reference data resulting in a reference sequence, generating an index for the reference sequence from the reference sequence, generating an entry containing reference data metadata, and storing the entry within the index.

10. The method of claim 7, wherein the characterizations for the reference data are generated by applying a second hash function to each partitioning of each data, saving at least one bit for each partitioning to generate a symbol, and concatenate the symbols into a continuous stream associated with the reference data.

* * * * *